United States Patent
Tsai

(10) Patent No.: US 7,652,878 B2
(45) Date of Patent: Jan. 26, 2010

(54) MODULAR COMPUTER HOUSING

(75) Inventor: Hung-Chieh Tsai, Taipei Hsien (TW)

(73) Assignee: Aopen Inc., Taipei Hsien (TW)

( * ) Notice: Subject to any disclaimer, the term of this patent is extended or adjusted under 35 U.S.C. 154(b) by 254 days.

(21) Appl. No.: 11/590,939

(22) Filed: Oct. 31, 2006

(65) Prior Publication Data

US 2007/0230102 A1    Oct. 4, 2007

(30) Foreign Application Priority Data

Apr. 3, 2006    (TW) ............................... 95111788 A

(51) Int. Cl.
H05K 5/00    (2006.01)
H05K 7/00    (2006.01)
G06F 1/20    (2006.01)
A47B 81/00   (2006.01)

(52) U.S. Cl. ............................. 361/679.33; 361/679.4; 361/679.02; 361/679.46; 361/679.55; 361/752; 312/223.2

(58) Field of Classification Search ................ 361/683, 361/679.02, 679.33, 679.4, 679.46, 679.55, 361/752; 312/223.2
See application file for complete search history.

(56) References Cited

U.S. PATENT DOCUMENTS

| | | | | | |
|---|---|---|---|---|---|
| 4,742,478 | A | * | 5/1988 | Nigro et al. | ............. 361/679.09 |
| 5,159,533 | A | * | 10/1992 | Kuang | ......................... 361/686 |
| 5,323,291 | A | * | 6/1994 | Boyle et al. | ............. 361/679.42 |
| 5,440,450 | A | * | 8/1995 | Lau et al. | ..................... 361/695 |
| 5,708,561 | A | | 1/1998 | Huilgol et al. | |
| 5,717,575 | A | * | 2/1998 | Copeland et al. | ............ 361/756 |
| 6,205,020 | B1 | * | 3/2001 | Felcman et al. | ........ 361/679.31 |
| 6,238,026 | B1 | * | 5/2001 | Adams et al. | ............ 312/223.2 |
| 6,317,318 | B1 | * | 11/2001 | Kim | ........................... 361/685 |
| 6,370,099 | B1 | * | 4/2002 | Crigler | ....................... 720/732 |
| 6,407,910 | B1 | | 6/2002 | Diaz et al. | |
| 6,466,434 | B1 | * | 10/2002 | Tsai | ........................... 361/685 |

(Continued)

FOREIGN PATENT DOCUMENTS

JP    2004-086674    3/2004

(Continued)

OTHER PUBLICATIONS

Search Report issued by European Patent Office on Mar. 6, 2009 for corresponding European application 06024546.1.

*Primary Examiner*—Jayprakash N Gandhi
*Assistant Examiner*—Bradley H Thomas
(74) *Attorney, Agent, or Firm*—Frommer Lawrence & Haug LLP; Ronald R. Santucci

(57) ABSTRACT

A computer housing includes a main housing, a mounting frame, and a first cover. The main housing defines an accommodation space adapted to receive a motherboard module and a data-reading device therein. The mounting frame is disposed removably within the main housing, and is adapted to be mounted with the data-reading device thereon. The first cover is attached openably and closably to the main housing, and is disposed in proximity to the mounting frame for covering a top end of the accommodation space in the main housing. A first notch in the main housing is aligned with a second notch in the first cover such that the first and second notches form cooperatively an opening aligned with a disk slot in the data-reading device.

31 Claims, 5 Drawing Sheets

U.S. PATENT DOCUMENTS

| | | | |
|---|---|---|---|
| 6,565,444 B2 * | 5/2003 | Nagata et al. | 463/46 |
| 6,621,691 B2 * | 9/2003 | Howell | 361/683 |
| 6,862,172 B2 * | 3/2005 | Erickson et al. | 361/685 |
| 6,965,516 B1 * | 11/2005 | Lin | 361/727 |
| 7,499,113 B2 * | 3/2009 | Yokawa | 348/836 |
| 2003/0123220 A1 * | 7/2003 | Huang | 361/685 |
| 2005/0245313 A1 * | 11/2005 | Yoshino et al. | 463/30 |
| 2006/0146492 A1 * | 7/2006 | Reents et al. | 361/685 |

FOREIGN PATENT DOCUMENTS

JP     2006-349074 A     12/2006

* cited by examiner

MODULAR COMPUTER HOUSING

CROSS-REFERENCE TO RELATED APPLICATION

This application claims priority of Taiwanese Application No. 095111788, filed on Apr. 3, 2006.

BACKGROUND OF THE INVENTION

1. Field of the Invention

This invention relates to a computer housing, and more particularly to a modular computer housing that can be disassembled with ease.

2. Description of the Related Art

Referring to FIG. 1, a so-called barebone computer housing system 1 is non-standardized, and includes an upper housing 11 adapted to be mounted with an optical disk drive 21, and a lower housing 12 adapted to be mounted with a hard disk 22 and a motherboard module 23. The optical disk drive 21 is coupled electrically to the hard disk 22 and the motherboard module 23 by a plurality of ribbon cables 14. When it is desired to remove an interior member (such as the optical disk drive 21, the hard disk 22, or the mother board module 23) from the computer housing system 1, the upper and lower housings 11, 12 are first separated from each other. After the interior member 21, 22, 23 is removed, the upper and lower housings 11, 12 are re-joined. A drawback of the aforesaid computer housing system 1 is that, during removal of the interior members 21, 22, 23, it is necessary to proceed carefully so that unintentional disconnection of the ribbon cables 14 doest not occur. Such disconnection of the ribbon cables 14 and separation and re-joining of the upper and lower housings 11, 12 result in difficulties during assembly and disassembly. If extreme care is not taken, damage to the interior members 21, 22, 23 may result.

SUMMARY OF THE INVENTION

The object of this invention is to provide a modular computer housing that can be easily assembled and disassembled and that avoids the problem of unintentional disconnection of ribbon cables when an interior member, such as a data-reading device, is removed from the computer housing.

According to this invention, a computer housing includes a main housing, a mounting frame, and a first cover. The main housing defines an accommodation space adapted to receive a motherboard module and a data-reading device therein. The mounting frame is disposed removably within the main housing, and is adapted to be mounted with the data-reading device thereon. The first cover is attached openably and closably to the main housing, and is disposed in proximity to the mounting frame for covering a top end of the accommodation space in the main housing. A first notch in the main housing is aligned with a second notch in the first cover such that the first and second notches form cooperatively an opening aligned with a disk slot in the data-reading device.

To remove the first cover from the main housing so as to gain access to the accommodation space in the main housing, the user needs only to insert his or her hand into the opening and apply an upward force to a wall of the first cover defining the second notch. Furthermore, since the mounting frame is disposed removably within the main housing and since the data-reading device is mounted on the mounting frame, an assembly of the mounting frame and the data-reading device can be easily removed from the main housing.

BRIEF DESCRIPTION OF THE DRAWINGS

These and other features and advantages of this invention will become apparent in the following detailed description of a preferred embodiment of this invention, with reference to the accompanying drawings, in which.

DETAILED DESCRIPTION OF THE PREFERRED EMBODIMENT

Figure 1:
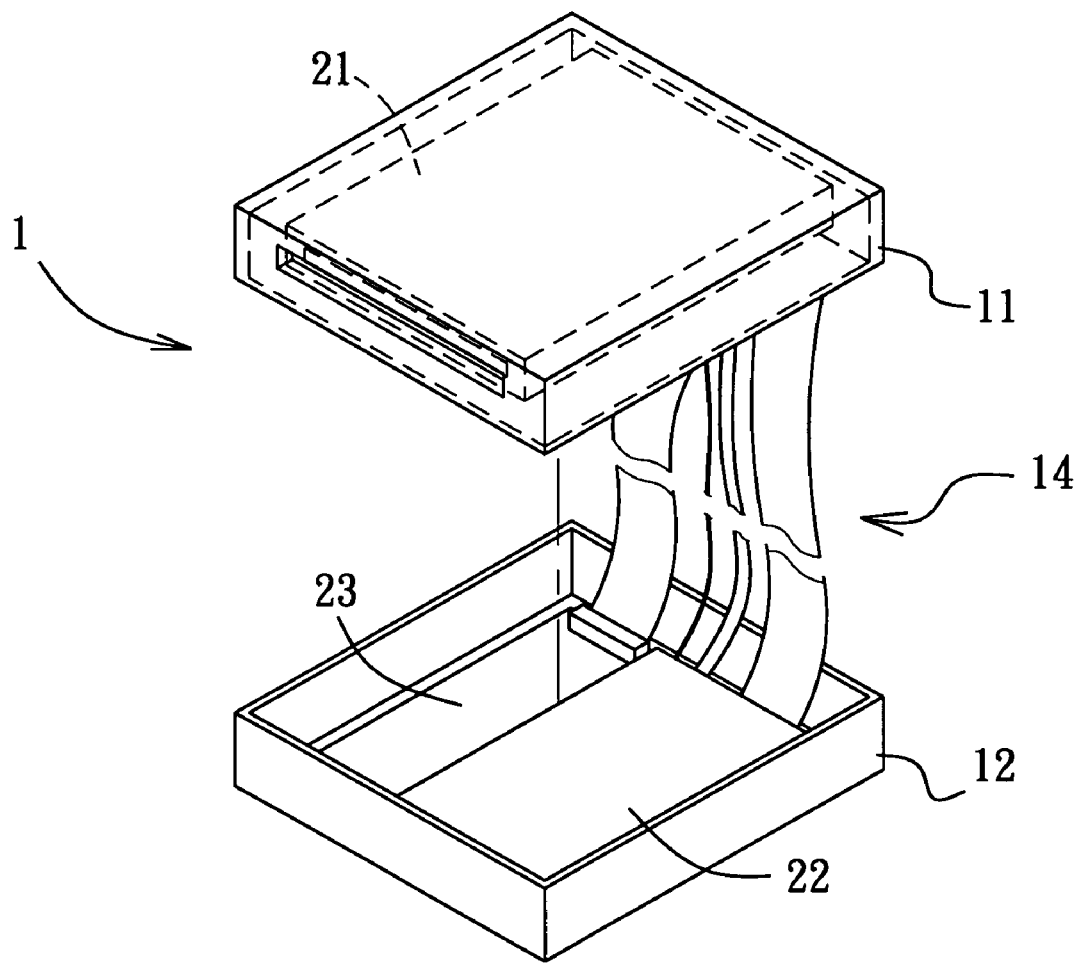
FIG. 1 is an exploded perspective view of a conventional computer housing system, which is mounted with an optical disk drive, a hard disk, and a motherboard module.
Figure 2:
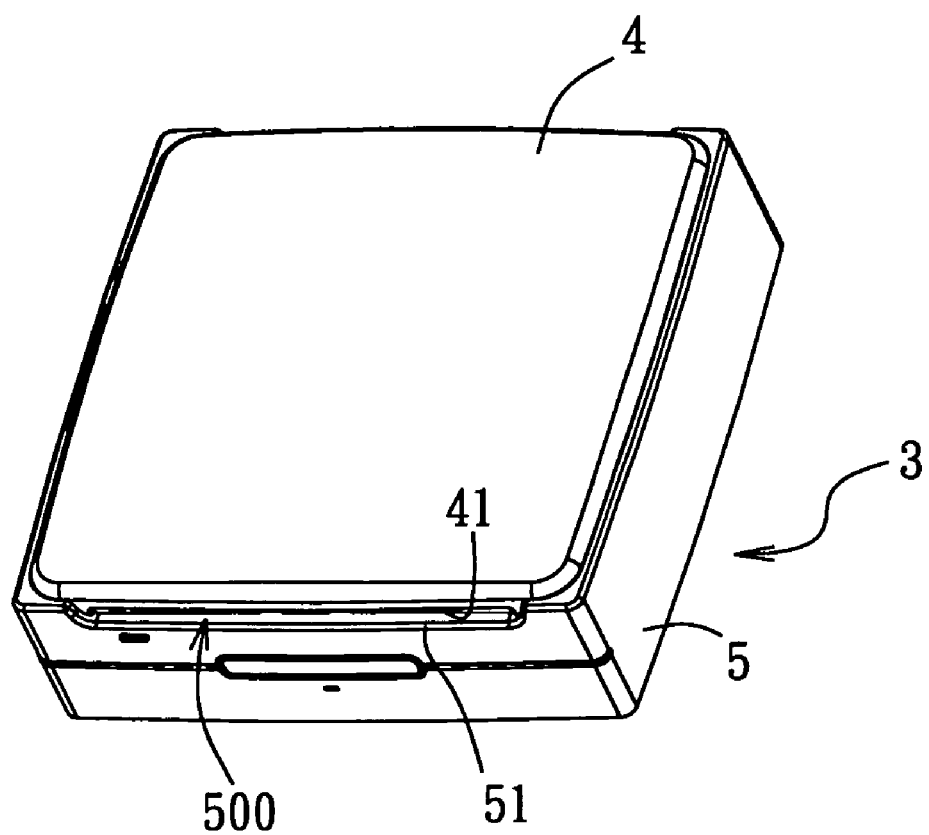
FIG. 2 is an assembled perspective view of the preferred embodiment of a modular computer housing according to this invention.
Figure 3:
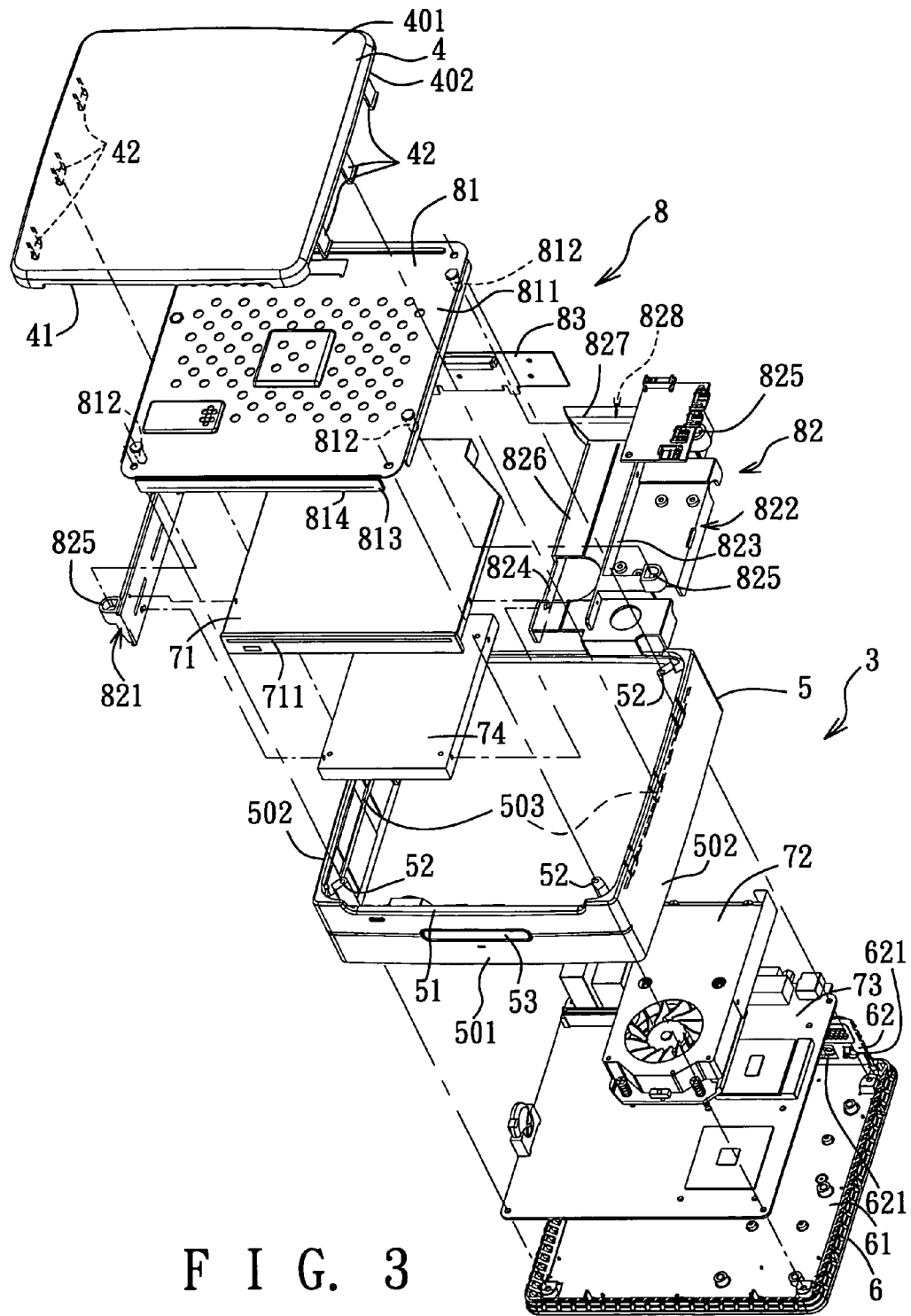
FIG. 3 is an exploded perspective view of the preferred embodiment, which is mounted with an optical disk drive, a hard disk, and a motherboard module.

Referring to FIGS. 2 and 3, the preferred embodiment of a modular computer housing according to this invention includes a main housing 3, a mounting frame 8, and a first cover 4. The mounting frame 8 is disposed removably within the main housing 3. The first cover 4 is attached openably and closably to the main housing 3, and is disposed in proximity to the mounting frame 8. The computer housing is adapted to be mounted with a motherboard module 73, a data-reading device 71, a data storage device 74, and a heat dissipation device 72 therein. In this embodiment, the data-reading device 71 is configured as an optical disk drive, and has a disk slot 711 for entry and exit of a disk (not shown), and the data storage device 74 is configured as a hard disk.

Figure 4:
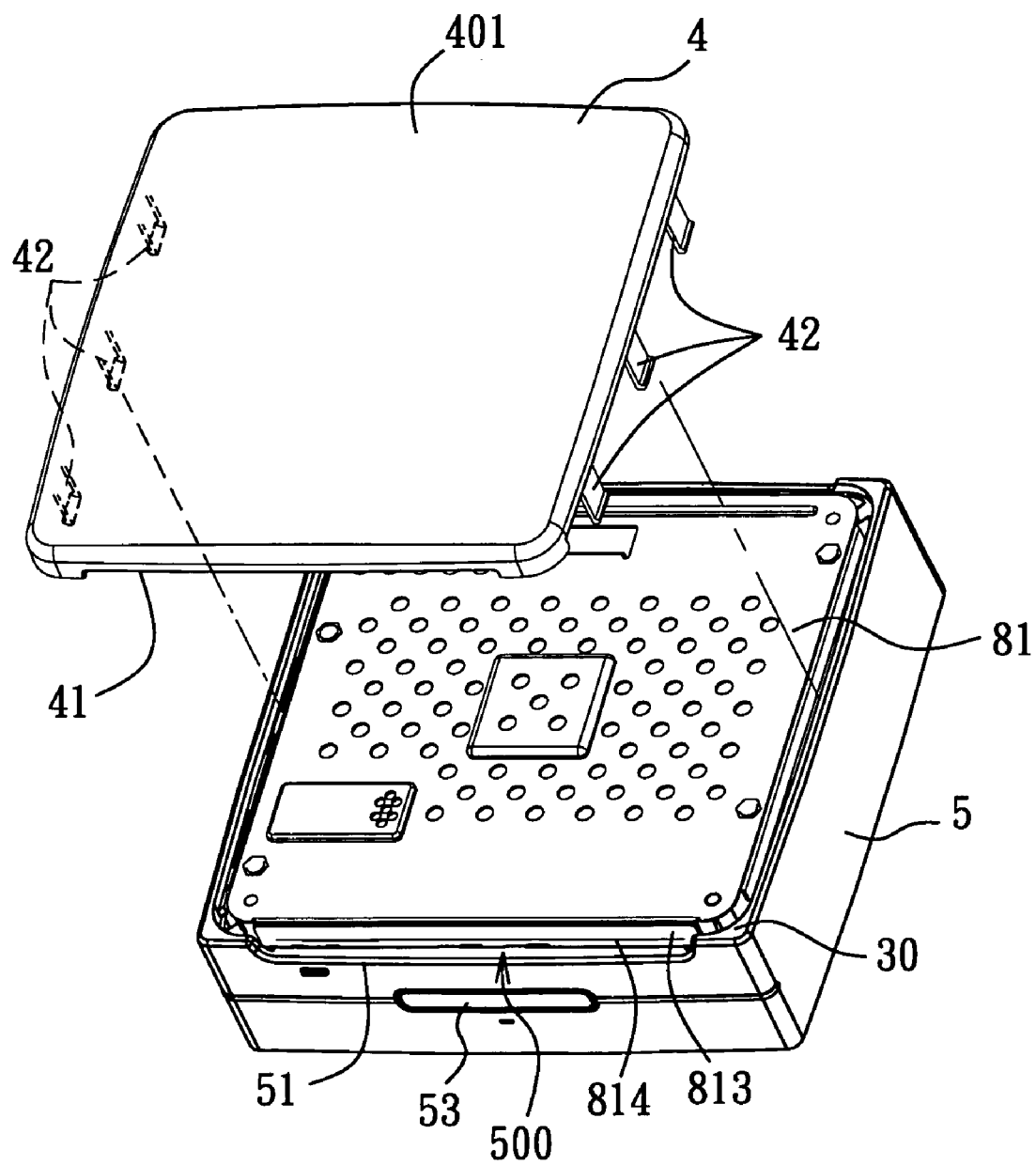
FIG. 4 is a partly exploded perspective view of the preferred embodiment, illustrating how a first cover is removed from a main housing.
Figure 5:
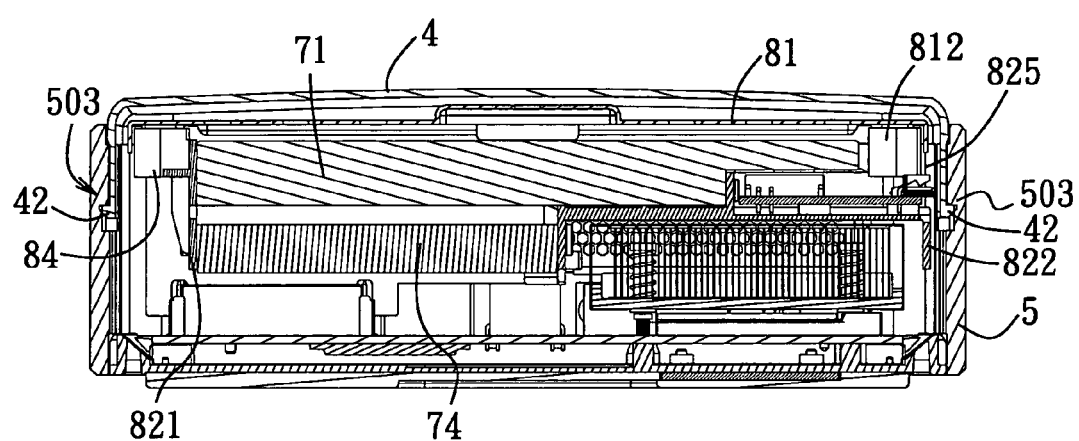
FIG. 5 is a sectional view of the preferred embodiment.

Referring to FIGS. 3, 4, and 5, the main housing 3 is open at a top end thereof, and includes a housing body 5 and a housing bottom 6. The housing bottom 6 includes a horizontal bottom wall 61, and an upright plate 62 extending integrally and upwardly from a rear side of the bottom wall 61. The upright plate 62 is formed with a plurality of grooves 621 of different sizes therethrough, and a ventilation outlet (not shown). The housing body 5 is configured as a rectangular frame, and has a front wall 501 and two lateral side walls 502 connected respectively and integrally to two opposite sides of the front wall 501. A top edge of the housing body 5 (i.e., an upper end of the front wall 501) is formed with a U-shaped first notch 51. The front wall 501 is provided with an ON/OFF switch 53. The housing body 5 further has an inner wall surface formed with a slot unit, and a plurality of positioning posts 52 disposed respectively at four corners thereof. The slot unit consists of two horizontal slots 503 that are formed respectively in the lateral sidewalls 502. The housing body 5 cooperates with the housing bottom 6 to define an accommodation space 30 (see FIG. 4). An outer periphery of the housing bottom 6 is attached to a lower end of the housing body 5. The upright plate 62 is attached to rear ends of the lateral sidewalls 502. The bottom wall 61 is mounted fixedly with the motherboard module 73. The motherboard module 73 is mounted with the heat dissipation device 72.

The first cover 4 includes a horizontal top wall 401, a surrounding wall 402 extending integrally and downwardly from an outer periphery of the top wall 401, and a plurality of L-shaped retaining plates 42 extending integrally and downwardly from a lower end of the surrounding wall 402. The surrounding wall 402 has a bottom edge that abuts against the top edge of the housing body 5 and that is formed with an inverted U-shaped second notch 41.

The mounting frame 8 includes a second cover 81 and a frame body unit 82 connected fixedly to and disposed under the second cover 81. The second cover 81 has a plurality of first positioning portions 812. The frame body unit 82 has a plurality of second positioning portions 825 connected respectively and removably to the first positioning portions 812 of the second cover 81.

The second cover 81 includes a cover plate 811 and a downward extension plate 813 extending integrally and downwardly from a front side of the cover plate 811. The extension plate 813 is formed with a slot 814 therethrough. The second positioning portions 825 are configured as vertical holes. The first positioning portions 812 are configured as posts engaging respectively the vertical holes.

The frame body unit 82 includes first and second frame bodies 821, 822 connected respectively and fixedly to two opposite sides of the data-reading device 71 and the data storage device 74, as shown in FIG. 5. The second positioning portions 825 are disposed on the first and second frame bodies 821, 822. The data-reading device 71 is positioned adjacent to the data storage device 74 by engagement between the first and second positioning portions 812, 825 such that the data storage device 74 is disposed under the data-reading device 71. Hence, an assembly of the frame body unit 82, the data-reading device 71, the data storage device 74, and the second cover 81 can be placed into the accommodation space 30 in the main housing 3.

The first frame body 821 is configured as a vertical plate, and has an inner side surface abutting against the data-reading device 71 and the data storage device 74, and an outer side surface opposite to the inner side surface and formed with the corresponding second positioning portions 825. A plurality of bolts 84 (see FIG. 5) extend respectively through the second positioning portions 825 of the first and second frame bodies 821, 822. Each of the bolts 84 engages a threaded hole in the corresponding first positioning portion 812 of the second cover 81. As such, the first and second frame bodies 821, 822 are attached fixedly to the second cover 81.

The second frame body 822 includes a horizontal top plate 826 formed with the corresponding second positioning portions 825, a vertical upper side plate 823 extending integrally and upwardly from the top plate 826, and a vertical lower side plate 824 extending integrally and downwardly from the top plate 826. A rear end of the top plate 826 is formed with a surrounding wall 827 that extends rearwardly therefrom. The surrounding wall 827 has a rectangular cross section, and defines a ventilation outlet 828 aligned with the heat dissipation device 72 for outflow of hot air from the heat dissipation device 72 therethrough. The upper and lower side plates 823, 824 are aligned horizontally and respectively with upper and lower portions of the first frame body 821.

The data-reading device 71 is mounted fixedly between the upper side plate 823 of the second frame body 822 and the upper portion of the first frame body 821. The data storage device 74 is mounted fixedly between the lower side plate 824 of the second frame body 822 and the lower portion of the first frame body 821. As such, the data-reading device 71 and the data storage device 74 are disposed under the second cover 81. The data-reading device 71 and the data storage device 74 are interconnected by an electrical connector 83 in the form of a circuit board. The electrical connector 83 is inserted into the motherboard module 73. A plurality of bolts (not shown) extend through the second cover 81, the positioning posts 52 of the housing body 5, the motherboard module 73, and engage respectively threaded holes in the housing body 6. As such, the second cover 81 is positioned within the main housing 3. The slot 814 in the extension plate 813 of the second cover 81 is aligned with the disk slot 711 in the data-reading device 71.

After the assembly of the mounting frame 8, the data-reading device 71, and the data storage device 74 has been fixed within the main housing 3, as described above, the retaining plates 42 of the first cover 4 are inserted through a space between the housing body 5 and the second cover 81 to thereby engage the slots 503 in the housing body 5. As such, the first cover 4 is connected removably to the main housing 3, and a top end of the accommodating space 30 in the main housing 3 is covered. In this state, the second notch 41 in the first cover 4 is aligned with the first notch 51 in the front wall 501 of the housing body 5. As such, the first and second notches 51, 41 form cooperatively an opening 500 aligned with the slot 814 in the extension plate 813 of the second cover 81 and the disk slot 711 in the data-reading device 71. The opening 500, the slot 814, and the disk slot 711 constitute cooperatively a disk passage.

To remove the first cover 4 from the main housing 3, the user needs only to insert his or her hand into the opening 500 and apply an upward force to a wall of the first cover 4 defining the second notch 41. This removes the retaining plates 42 of the first cover 4 from the slots 503 in the housing body 5. Subsequently, the assembly of the mounting frame 8, the data-reading device 71, and the data storage device 74 is separated from the main housing 3. As such, interior members including the data-reading device 71, the motherboard module 73, and the data storage device 74 can be easily removed from the main housing 3, thereby facilitating repair and/or replacement of any one of the main housing 3, the mounting frame 8, the first cover 4, and the interior members 71, 73, 74. Alternatively, the first cover 4 may be connected pivotally to the main housing 3. That is, the first cover 4 may be pivoted to open the top end of the main housing 3 so as to gain access to the accommodation space 30 in the main housing 3.

Since the data-reading device 71 and the data storage device 74 are interconnected by the electrical connector 83, and since the assembly of the mounting frame 8, the data-reading device 71, and the data storage device 74 can be removed from the main housing 3, unintentional disconnection of the data-reading device 71 and the data storage device 74 can be prevented during removal thereof.

With this invention thus explained, it is apparent that numerous modifications and variations can be made without departing from the scope and spirit of this invention. It is therefore intended that this invention be limited only as indicated by the appended claims.

I claim:

1. A computer housing adapted to be mounted with a motherboard module and a data-reading device therein, the data-reading device having a disk slot for entry and exit of a disk, said computer housing comprising:

a main housing defining an accommodation space adapted to receive the motherboard module and the data-reading device therein, said main housing having a first notch;

a mounting frame disposed removably within said main housing and adapted to be spaced apart from the motherboard module, said mounting frame being adapted to support the data-reading device thereon; and a first cover attached openably and closably to said main housing for covering a top end of said accommodation space in said main housing, said first cover having a second notch aligned with said first notch in said main housing such that said first and second notches form cooperatively an opening aligned with the disk slot in the data-reading device;

wherein said mounting frame includes a second cover and a frame body unit connected fixedly to and disposed under said second cover, said frame body unit being adapted to be connected fixedly to the data-reading device such that the data-reading device is disposed under said second cover;

wherein said second cover has a plurality of first positioning portions, said frame body unit having a plurality of second positioning portions connected respectively and removably to said first positioning portions of said second cover;

wherein said frame body unit includes first and second frame bodies adapted to be connected respectively and fixedly to two opposite sides of the data-reading device, said second positioning portions being disposed on said first and second frame bodies; and wherein said first frame body is configured as a vertical plate, and has an inner side surface abutting against a corresponding one of the sides of the data-reading device, and an outer side surface opposite to said inner side surface and formed with corresponding ones of said second positioning portions, said second frame body including a horizontal top plate formed with corresponding ones of said second positioning portions, a vertical upper side plate extending integrally and upwardly from said top plate, and a vertical lower side plate extending integrally and downwardly from said top plate, said upper and lower side plates of said second frame body being aligned respectively with upper and lower portions of said first frame body, said upper side plate of said second frame body and said upper portion of said first frame body being adapted to be mounted fixedly with the data-reading device therebetween, said lower side plate of said second frame body and said lower portion of said first frame body being adapted to be mounted fixedly with a data storage device therebetween such that the data storage device is disposed under the data-reading device.

2. The computer housing as claimed in claim 1, wherein said main housing includes a housing body having a top edge formed with said first notch, said first notch being U-shaped, said first cover having a bottom edge that abuts against said top edge of said housing body and that is formed with said second notch, said second notch being inverted U-shaped.

3. The computer housing as claimed in claim 2, wherein said main housing further includes a housing bottom cooperating with said housing body to define said accommodation space, said housing body being configured as a rectangular frame and further having a front wall and two lateral sidewalls connected respectively and integrally to two opposite sides of said front wall, said top edge serving as an upper end of said front wall, said housing bottom including a horizontal bottom wall having a rear side, and an upright plate extending integrally and upwardly from said rear side of said bottom wall, said upright plate being formed with a plurality of grooves therethrough, said upright plate being attached to rear ends of said lateral sidewalls of said housing body, said bottom wall being adapted to be mounted fixedly with the motherboard module.

4. The computer housing as claimed in claim 1, wherein said second positioning portions of said frame body unit are configured as vertical holes, said first positioning portions of said second cover being configured as posts engaging respectively said vertical holes.

5. The computer housing as claimed in claim 1, wherein said second positioning portions of said frame body unit are configured as vertical holes, said first positioning portions of said second cover being configured as posts engaging respectively said vertical holes.

6. The computer housing as claimed in claim 1, wherein said main housing has an inner wall surface formed with a plurality of positioning posts, said second cover being connected threadedly to said positioning posts and being positioned within said main housing.

7. The computer housing as claimed in claim 1, wherein said first cover is connected removably to said main housing.

8. The computer housing as claimed in claim 7, wherein said first cover includes a horizontal top wall, a surrounding wall extending integrally and downwardly from an outer periphery of said top wall, and a plurality of L-shaped retaining plates extending integrally and downwardly from a lower end of said surrounding wall, an inner wall surface of said main housing being formed with a slot unit, said L-shaped retaining plates engaging said slot unit in said main housing so as to connect said first cover removably to said main housing, said second notch being formed in said lower end of said surrounding wall.

9. The computer housing as claimed in claim 1, the motherboard module being mounted with a heat dissipation device, wherein said second frame body has a rear end formed with a ventilation outlet adapted to be aligned with the heat dissipation device so as to allow for outflow of hot air from the heat dissipation device therethrough.

10. A computer housing adapted to be mounted with a motherboard module and a data-reading device therein, the data-reading device having a disk slot for entry and exit of a disk, said computer housing comprising:

a main housing defining an accommodation space adapted to receive the motherboard module and the data-reading device therein, said main housing having a first notch;

a mounting frame disposed removably within said main housing and adapted to be spaced apart from the motherboard module, said mounting frame being adapted to support the data-reading device thereon; and a first cover attached openably and closably to said main housing for covering a top end of said accommodation space in said main housing, said first cover having a second notch aligned with said first notch in said main housing such that said first and second notches form cooperatively an opening aligned with the disk slot in the data-reading device;

wherein said main housing includes a housing body having a top edge formed with said first notch, said first notch being U-shaped, said first cover having a bottom edge that abuts against said top edge of said housing body and that is formed with said second notch, said second notch being inverted U-shaped; and wherein said main housing further includes a housing bottom cooperating with said housing body to define said accommodation space, said housing body being configured as a rectangular frame and further having a front wall and two lateral sidewalls connected respectively and integrally to two opposite sides of said front wall, said top edge serving as an upper end of said front wall, said housing bottom including a horizontal bottom wall having a rear side, and an upright plate extending integrally and upwardly from said rear side of said bottom wall, said upright plate being formed with a plurality of grooves therethrough, said upright plate being attached to rear ends of said lateral sidewalls of said housing body, said bottom wall being adapted to be mounted fixedly with the motherboard module.

11. The computer housing as claimed in claim 10, wherein said mounting frame includes a second cover and a frame body unit connected fixedly to and disposed under said second cover, said frame body unit being adapted to be connected fixedly to the data-reading device such that the data-reading device is disposed under said second cover.

12. The computer housing as claimed in claim 11, wherein said second cover has a plurality of first positioning portions, said frame body unit having a plurality of second positioning portions connected respectively and removably to said first positioning portions of said second cover.

13. The computer housing as claimed in claim 12, wherein said frame body unit includes first and second frame bodies adapted to be connected respectively and fixedly to two opposite sides of the data-reading device, said second positioning portions being disposed on said first and second frame bodies.

14. The computer housing as claimed in claim 13, wherein said first frame body is configured as a vertical plate, and has an inner side surface abutting against a corresponding one of the sides of the data-reading device, and an outer side surface opposite to said inner side surface and formed with corresponding ones of said second positioning portions, said second frame body including a horizontal top plate formed with corresponding ones of said second positioning portions, a vertical upper side plate extending integrally and upwardly from said top plate, and a vertical lower side plate extending integrally and downwardly from said top plate, said upper and lower side plates of said second frame body being aligned respectively with upper and lower portions of said first frame body, said upper side plate of said second frame body and said upper portion of said first frame body being adapted to be mounted fixedly with the data-reading device therebetween, said lower side plate of said second frame body and said lower portion of said first frame body being adapted to be mounted fixedly with a data storage device therebetween such that the data storage device is disposed under the data-reading device.

15. The computer housing as claimed in claim 14, the motherboard module being mounted with a heat dissipation device, wherein said second frame body has a rear end formed with a ventilation outlet adapted to be aligned with the heat dissipation device so as to allow for outflow of hot air from the heat dissipation device therethrough.

16. The computer housing as claimed in claim 12, wherein said second positioning portions of said frame body unit are configured as vertical holes, said first positioning portions of said second cover being configured as posts engaging respectively said vertical holes.

17. The computer housing as claimed in claim 13, wherein said second positioning portions of said frame body unit are configured as vertical holes, said first positioning portions of said second cover being configured as posts engaging respectively said vertical holes.

18. The computer housing as claimed in claim 11, wherein said main housing has an inner wall surface formed with a plurality of positioning posts, said second cover being connected threadedly to said positioning posts and being positioned within said main housing.

19. The computer housing as claimed in claim 10, wherein said first cover is connected removably to said main housing.

20. The computer housing as claimed in claim 19, wherein said first cover includes a horizontal top wall, a surrounding wall extending integrally and downwardly from an outer periphery of said top wall, and a plurality of L-shaped retaining plates extending integrally and downwardly from a lower end of said surrounding wall, an inner wall surface of said main housing being formed with a slot unit, said L-shaped retaining plates engaging said slot unit in said main housing so as to connect said first cover removably to said main housing, said second notch being formed in said lower end of said surrounding wall.

21. A computer housing adapted to be mounted with a motherboard module and a data-reading device therein, the data-reading device having a disk slot for entry and exit of a disk, said computer housing comprising:
 a main housing defining an accommodation space adapted to receive the motherboard module and the data-reading device therein, said main housing having a first notch;
 a mounting frame disposed removably within said main housing and adapted to be spaced apart from the motherboard module, said mounting frame being adapted to support the data-reading device thereon; and
 a first cover attached openably and closably to said main housing for covering a top end of said accommodation space in said main housing, said first cover having a second notch aligned with said first notch in said main housing such that said first and second notches form cooperatively an opening aligned with the disk slot in the data-reading device;
 wherein said first cover is connected removably to said main housing; and
 wherein said first cover includes a horizontal top wall, a surrounding wall extending integrally and downwardly from an outer periphery of said top wall, and a plurality of L-shaped retaining plates extending integrally and downwardly from a lower end of said surrounding wall, an inner wall surface of said main housing being formed with a slot unit, said L-shaped retaining plates engaging said slot unit in said main housing so as to connect said first cover removably to said main housing, said second notch being formed in said lower end of said surrounding wall.

22. The computer housing as claimed in claim 21, wherein said main housing includes a housing body having a top edge formed with said first notch, said first notch being U-shaped, said first cover having a bottom edge that abuts against said top edge of said housing body and that is formed with said second notch, said second notch being inverted U-shaped.

23. The computer housing as claimed in claim 22, wherein said main housing further includes a housing bottom cooperating with said housing body to define said accommodation space, said housing body being configured as a rectangular frame and further having a front wall and two lateral sidewalls connected respectively and integrally to two opposite sides of said front wall, said top edge serving as an upper end of said front wall, said housing bottom including a horizontal bottom wall having a rear side, and an upright plate extending integrally and upwardly from said rear side of said bottom wall, said upright plate being formed with a plurality of grooves therethrough, said upright plate being attached to rear ends of said lateral sidewalls of said housing body, said bottom wall being adapted to be mounted fixedly with the motherboard module.

24. The computer housing as claimed in claim 21, wherein said mounting frame includes a second cover and a frame body unit connected fixedly to and disposed under said second cover, said frame body unit being adapted to be connected fixedly to the data-reading device such that the data-reading device is disposed under said second cover.

25. The computer housing as claimed in claim 24, wherein said second cover has a plurality of first positioning portions, said frame body unit having a plurality of second positioning portions connected respectively and removably to said first positioning portions of said second cover.

26. The computer housing as claimed in claim 25, wherein said frame body unit includes first and second frame bodies adapted to be connected respectively and fixedly to two opposite sides of the data-reading device, said second positioning portions being disposed on said first and second frame bodies.

27. The computer housing as claimed in claim 26, wherein said first frame body is configured as a vertical plate, and has an inner side surface abutting against a corresponding one of the sides of the data-reading device, and an outer side surface opposite to said inner side surface and formed with corresponding ones of said second positioning portions, said second frame body including a horizontal top plate formed with corresponding ones of said second positioning portions, a vertical upper side plate extending integrally and upwardly from said top plate, and a vertical lower side plate extending integrally and downwardly from said top plate, said upper and lower side plates of said second frame body being aligned respectively with upper and lower portions of said first frame body, said upper side plate of said second frame body and said upper portion of said first frame body being adapted to be mounted fixedly with the data-reading device therebetween, said lower side plate of said second frame body and said lower portion of said first frame body being adapted to be mounted fixedly with a data storage device therebetween such that the data storage device is disposed under the data-reading device.

28. The computer housing as claimed in claim 27, the motherboard module being mounted with a heat dissipation device, wherein said second frame body has a rear end formed with a ventilation outlet adapted to be aligned with the heat dissipation device so as to allow for outflow of hot air from the heat dissipation device therethrough.

29. The computer housing as claimed in claim 25, wherein said second positioning portions of said frame body unit are configured as vertical holes, said first positioning portions of said second cover being configured as posts engaging respectively said vertical holes.

30. The computer housing as claimed in claim 26, wherein said second positioning portions of said frame body unit are configured as vertical holes, said first positioning portions of said second cover being configured as posts engaging respectively said vertical holes.

31. The computer housing as claimed in claim 24, wherein said main housing has an inner wall surface formed with a plurality of positioning posts, said second cover being connected threadedly to said positioning posts and being positioned within said main housing.

* * * * *